United States Patent
Hellström

[11] Patent Number: 6,050,751
[45] Date of Patent: Apr. 18, 2000

[54] INDEXING OF CUTTING INSERTS

[75] Inventor: Lars Hellström, Arsunda, Sweden

[73] Assignee: Sandvik AB, Sandviken, Sweden

[21] Appl. No.: 09/101,968

[22] PCT Filed: Jan. 23, 1997

[86] PCT No.: PCT/SE97/00115

§ 371 Date: Jul. 21, 1998

§ 102(e) Date: Jul. 21, 1998

[87] PCT Pub. No.: WO97/27018

PCT Pub. Date: Jul. 31, 1997

[30] Foreign Application Priority Data

Jan. 26, 1996 [SE] Sweden ................................. 9600286

[51] Int. Cl.$^7$ ................................................. B23B 27/16
[52] U.S. Cl. ........................ 407/104; 407/105; 407/107; 407/113; 407/103
[58] Field of Search .................... 407/104, 102, 407/103, 107, 101, 113, 105

[56] References Cited

U.S. PATENT DOCUMENTS

| | | | |
|---|---|---|---|
| 3,299,489 | 1/1967 | Pohle | 407/104 |
| 3,341,920 | 9/1967 | Kelm | 407/113 X |
| 3,341,921 | 9/1967 | Weller et al. | |
| 3,525,136 | 8/1970 | Crosby | |
| 4,398,853 | 8/1983 | Erickson | 407/104 |
| 4,615,650 | 10/1986 | Hunt | 407/105 |

FOREIGN PATENT DOCUMENTS

| | | | |
|---|---|---|---|
| 864179 | 2/1971 | Canada | 407/104 |
| 9301400 | 10/1994 | Sweden . | |
| 468 860 | 2/1969 | Switzerland . | |

*Primary Examiner*—Henry W. H. Tsai
*Attorney, Agent, or Firm*—Burns, Doane, Swecker & Mathis, L.L.P.

[57] ABSTRACT

A cutting insert for chip-breaking metal machining includes an upper chip surface, a lower bottom surface, which is substantially plane parallel with the chip surface, one or several side surfaces that extend between said chip and bottom surfaces, and a through hole (12) for the accomodation of a locking screw (11). The hole (12) includes a rotation-asymmetrical portion (16) including a plurality of radially bulging portions (17) extending in the direction of the hole, the transitions (18) extending substantially in the direction of the hole between adjacent bulging portions being intended to pairwise abutting against the locking screw (11) and guiding the insert towards the right positioning in an insert seat, before the insert is clamped. In this way, it becomes considerably easier to position the cutting insert, particularly when it has a larger number of cutting edges, e.g. six or eight.

11 Claims, 6 Drawing Sheets

15
19
18

INDEXING OF CUTTING INSERTS

BACKGROUND OF THE INVENTION

1. Field of the Invention

The present invention relates to an indexable cutting insert for cutting metal machining.

2. Description of Related Art

The vast majority of the variety of different indexable cutting inserts, both single-sided and double-sided, existing today on the market, have a central through hole. This hole is intended for the accomodation of a suitable locking screw for clamping the indexable cutting insert or the cutting insert in a holder. If the cutting insert is intended for turning, the holder is normally a boring bar; if the cutting insert is intended for milling, the holder is for instance a milling cutter body, a long edge cutter or an end mill. Further, the insert may be intended for drilling and may then be clamped by a screw in a drill shaft. As known, the fact that the cutting insert is an indexable one means that one and the same cutting insert has two or more cutting edges, a new cutting edge being positioned or indexed into an operative position when the previous one has been worn out, and this is done by loosening the screw and turning the insert a certain fraction of a revolution.

Indexable cutting inserts are most commonly made of coated or uncoated cemented carbide, but inserts of different ceramic materials also exist. Usually, they have a square, triangular, rhombic, round, rectangular or hexagonal basic shape, but other basic shapes also occur. However, one thing they all have in common, viz. they are normally provided with a through central hole in the geometrical middle point. These holes may have different hole configurations, but a common feature for the vast majority is that the hole is rotation-symmetrical. This implies that the operator has to turn the indexable cutting insert around the loosened screw to substantially the right insert position before he/she tightens the screw again. Normally, the indexable cutting insert is "self-guiding" towards the support surfaces of the insert seat, but if these are small and/or if the insert has a plurality of sides (for instance six or eight), it may happen that the insert is forced into an erroneous intermediate position, and the insert will not be fastened steadily in the intended way and may be broken and/or the insert seat will be damaged.

SE-B-346 074 (& U.S. Pat. No. 3 341 921) discloses a triangular cutting insert with a central hole that also has a triangular basic shape, and also a conicity that widens upwards. The basic shape of the hole intends to offer a double contact surface instead of a single one for the screw in the insert hole, in order to avoid that the insert is lifted by the cutting forces. Further is it disclosed that the triangular basic shape of the hole gives a precise positioning of the insert. However, the shape of the hole is not meant to give a pre-positioning of the insert before it is fastened. Moreover, no possibility is given to deviate from the insert seat position predetermined by the triangular hole shape.

According to the Swedish patent application No. 9301400-9, the top opening of the insert hole is shaped with recesses in order to provide a well defined two point abutment between screw and insert. However, these recesses do not extend farther down in the insert hole, wherefore they in no way serve to enable a certain prepositioning of the insert before the screw is tightened.

OBJECTS AND SUMMARY

Thus, a first object of the present invention is to shape an indexable cutting insert in such a way that a certain prepositioning or guiding of the insert into the right position is made possible before the insert is clamped.

A second object of the present invention is to simplify and easy the clamping of indexable cutting inserts into the right position.

These and further objects have been attained in a surprising way by shaping the hole configuration with the features as defined in the characterizing clause of claim 1.

BRIEF DESCRIPTION OF THE DRAWINGS

For illustrative but non-limiting purposes, some preferred embodiments of the invention will now be described in more detail, with reference to the appended drawings. These are herewith briefly presented:

FIG. 4 illustrates the hole configuration in the insert according to the invention straight from the side, the screw not being fully threaded in.

DETAILED DESCRIPTION OF THE PREFERRED EMBODIMENTS

It should be noted that by the terms "horizontal" and "vertical" in the text underneath are intended the directions when the insert lies with its bottom surface on a wholly horizontal, planar ground.

Figure 1:
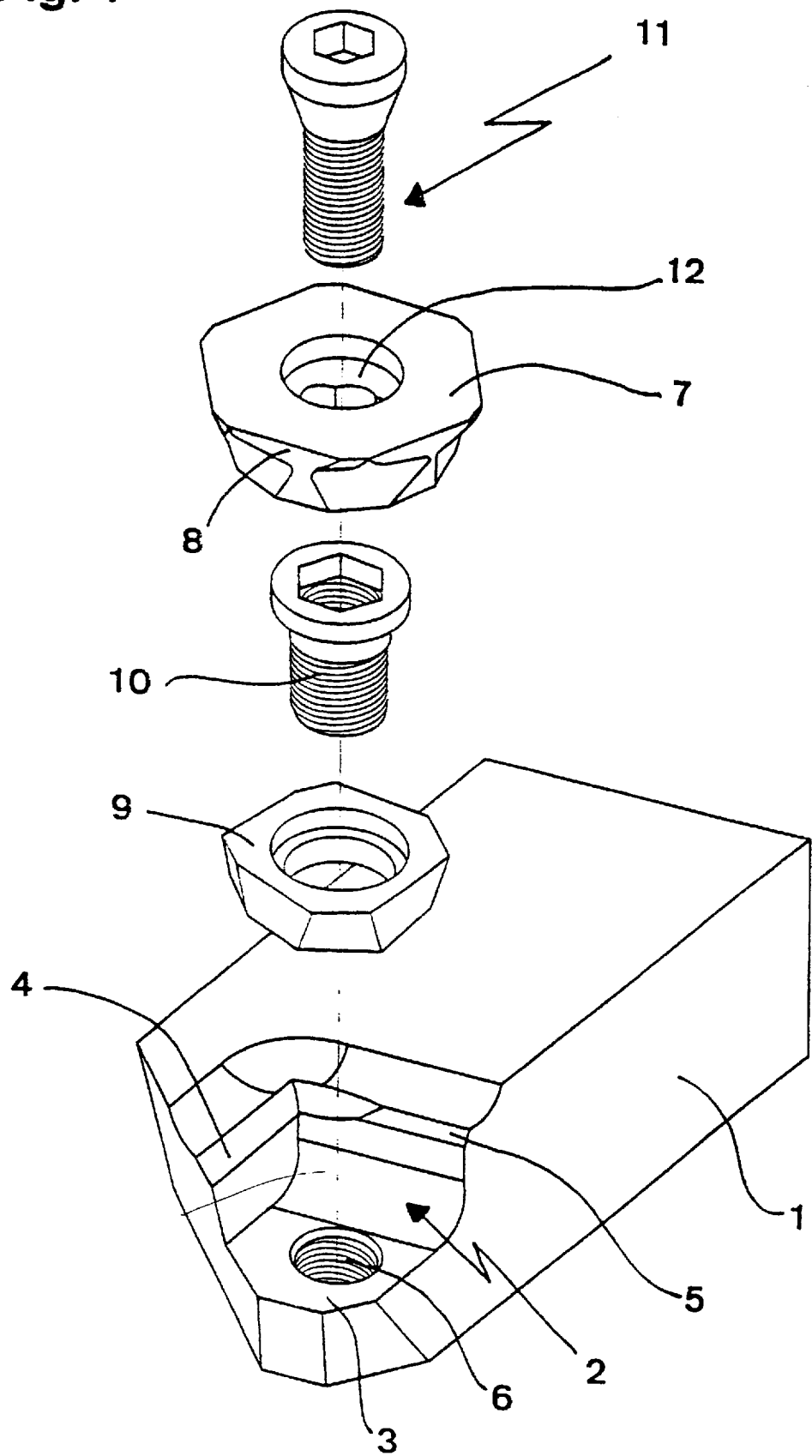
FIG. 1 shows an exploded view in perspective obliquely from above, of an insert seat with an insert according to the invention.

In FIG. 1 an arbitrary insert holder is generally designated by 1. The end that is intended to come into an operative engagement with a workpiece comprises an insert seat 2, which besides a few free surfaces comprises a bottom support surface 3, a threaded hole 6 and two abutment surfaces 4 and 5, respectively, which are intended to bear against and support cooperating abutment surfaces 8 on the insert 7. The geometry of the latter does not constitute any essential feature of the present invention, although its advantages stand out as most pronounced at a higher number of cutting edges, such as for inserts with a substantially regular pentagonal, hexagonal, heptagonal and octagonal basic geometry, preferably with a hexagonal or octagonal one. Moreover, also wholly round inserts are comprised by the present invention. In FIG. 1, the invention is illustrated by an indexable cutting insert 7, whose other geometry (i.e., disregarding the hole configuration) agrees with our previous Swedish patent application 9502645-6, which is hereby incorporated by this reference. Two adjacent abutment surfaces 8 of the insert bear against the two support surfaces 4 and 5 of the insert seat. The hole configuration of the insert according to the present invention is glimpsed in the insert hole 12 in FIG. 1.

In a conventional manner, a shim 9 may be placed under the indexable cutting insert 7, which shim is clamped by means of a shim screw 10, which is screwed into the hole 6. In turn, the locking screw 11 for the insert 7 is screwed into the inner thread of the shim screw 10.

Figure 2:
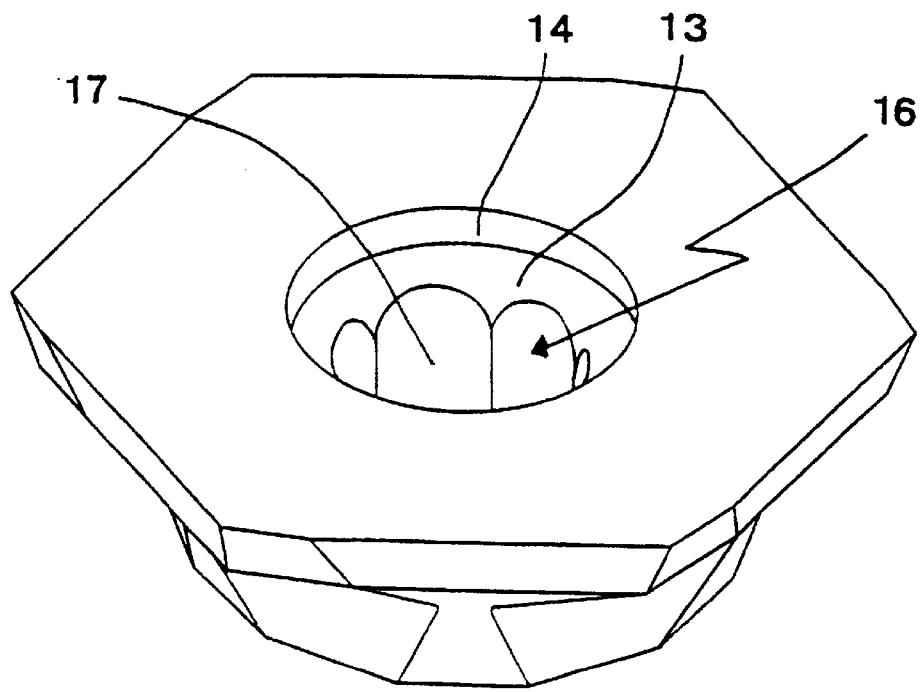
FIG. 2 shows an insert according to the invention in perspective, obliquely from above.

FIG. 2 shows in a clearer way how the insert hole 12 is configured. The hole configuration above the portion 16, which portion is essential for the invention, is not per se any essential feature of the present invention; the only essential matter of this portion is that it shall be capable of offering a bearing point or line for the underside 20 of the screw head 15. Suitably, the top opening portion of the hole is shaped in a conventional way, such as a rotation-symmetrical convex radius surface 13 and a cylindrical or slightly conical surface 14 above surface 13. Surface 14 is there for making possible a certain countersinking of the screw head 15. The surface portion 13 may also be substantially conical, although this constitutes a less preferred embodiment. Below the radius surface 13, the hole configuration transposes into a non-rotation-symmetrical portion 16, which suitably has a cross-sectional configuration that is similar to a flower, cf. FIGS. 3, 6, 7 and 8. However, in principle it may also have another cross-sectional shape that manages to fulfill the prepositioning effect on the insert according to the invention, for instance a multi-point star. The number of "petals" (or, e.g., "star points") corresponds to the basic shape of the cutting insert. Thus, for instance an insert with a hexagonal basic geometry has six radially bulging portions ("petals") 17. Alternatively, the number of "petals" corresponds to the number of indexation positions for a round insert. According to the figures, the uniformly rotation-asymmetrical portion 16 extends the whole way to the lower opening of the insert hole. However, said portion may also terminate before the lower opening. Correspondingly, the portion 16 also does not have to extend to the very radius surface 13.

Figure 3:
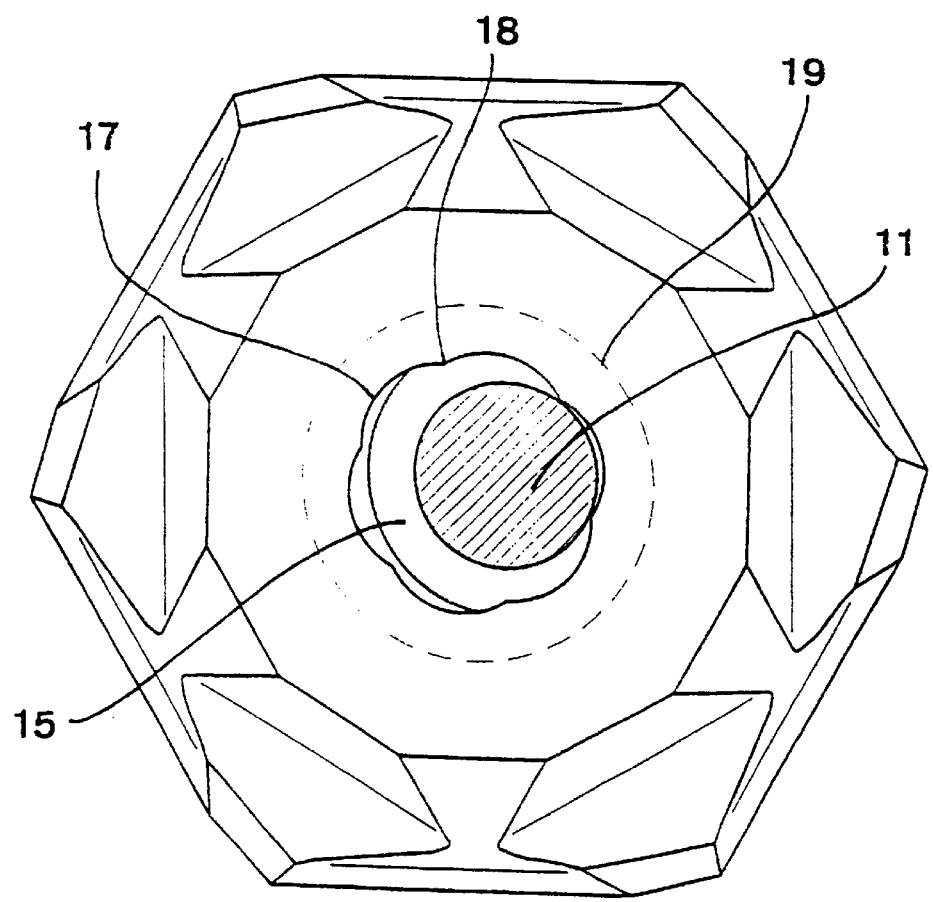
FIG. 3 shows an insert according to FIG. 2 straight from below, an inserted screw being sectioned in the plane of the insert's bottom surface.

FIG. 3 shows the cutting insert straight from below, the cross-section of the not fully tightened (cf. FIG. 4) screw 11 being shown in the plane of the bottom surface of the cutting insert. Hereby it may be seen how the at least partly threaded portion 21 of the screw bears against two vertical abutment lines 18, which constitute break lines between two adjacent bulgings 17. This well defined two line abutment is accomplished by the two bulging portions having smaller radii of curvature than the screw. Through the hole in FIG. 3, the bottom side of the screw head 15 is observable. The hidden upper opening 19 is dashed. The normal radially outwards, to a vertical middle line of a bulging is substantially so directed that the insert is guided to a correct position in the insert seat by means of the abutment lines 18, while the locking screw is screwed downwards, to eventually clamp the insert in that position.

Figure 4:
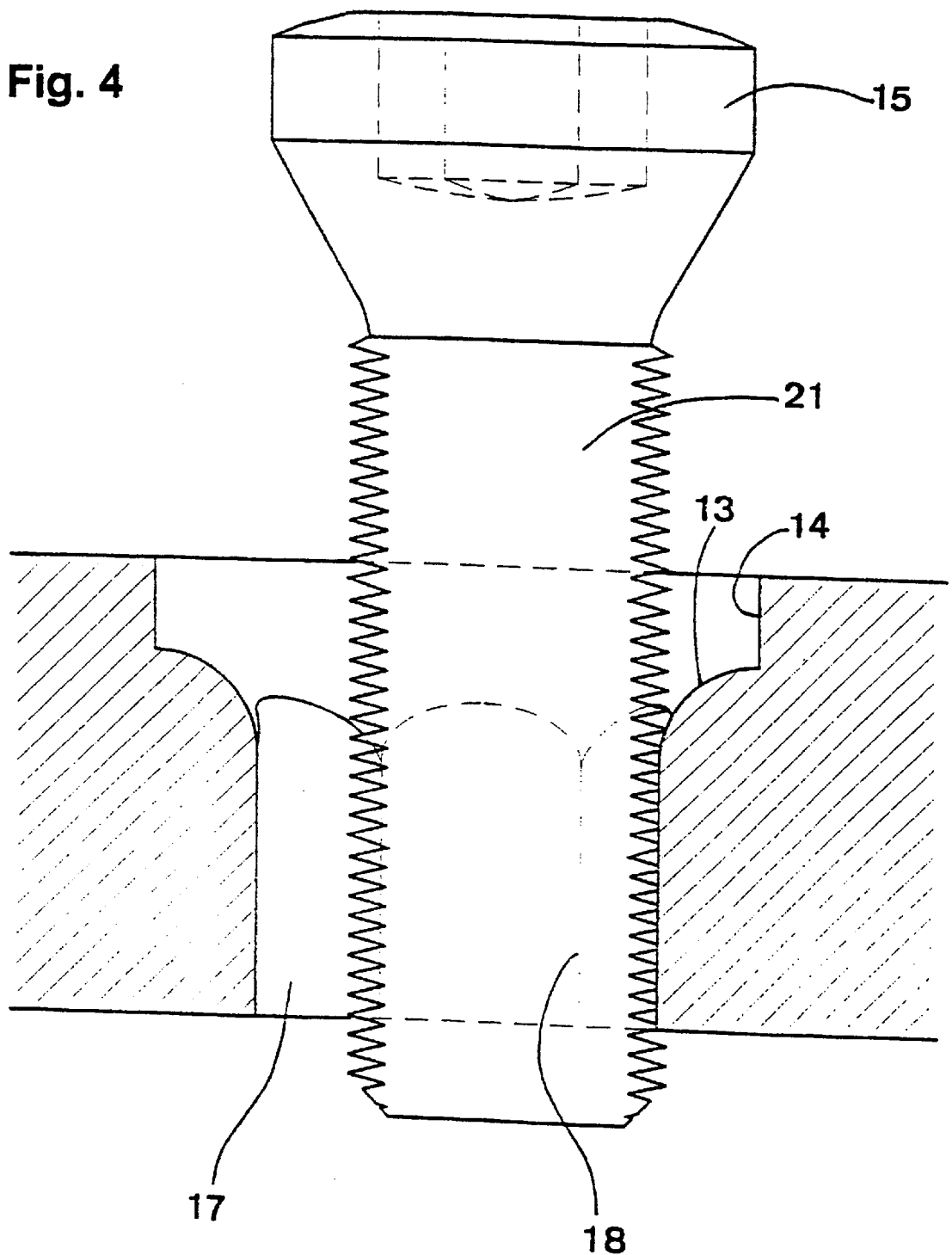

In FIG. 4 a vertical cross-section is shown through the central axis of an insert hole, the hole configuration in this case having six bulging portions 17. By the special hole configuration according to the invention, the insert is localized and guided to a correct position in the insert seat, i.e. the surfaces intended as abutment surfaces on the insert are brought to be pre-adjusted relative to corresponding support surfaces in the insert seat. The relation between on one hand the distance between the threaded hole 6 of the insert seat and the support surfaces 4 and 5, respectively, and on the other hand the size of the hole of the insert and the insert hole, respectively, is chosen so that the insert cannot be turned past a break line 18 when the insert bears against the bottom support surface. It is only possible to turn the insert and indexate a new operative cutting edge if one lifts the insert a bit up from the insert seat, so that the abutment surfaces of the insert become located above the support surfaces of the insert seat. It is true that in first hand the support surfaces of the insert seat will hinder a rotation of the insert when it rests upon the bottom support surface, but for wholly round inserts only the break lines 18 prevent this rotation.

Figure 5:
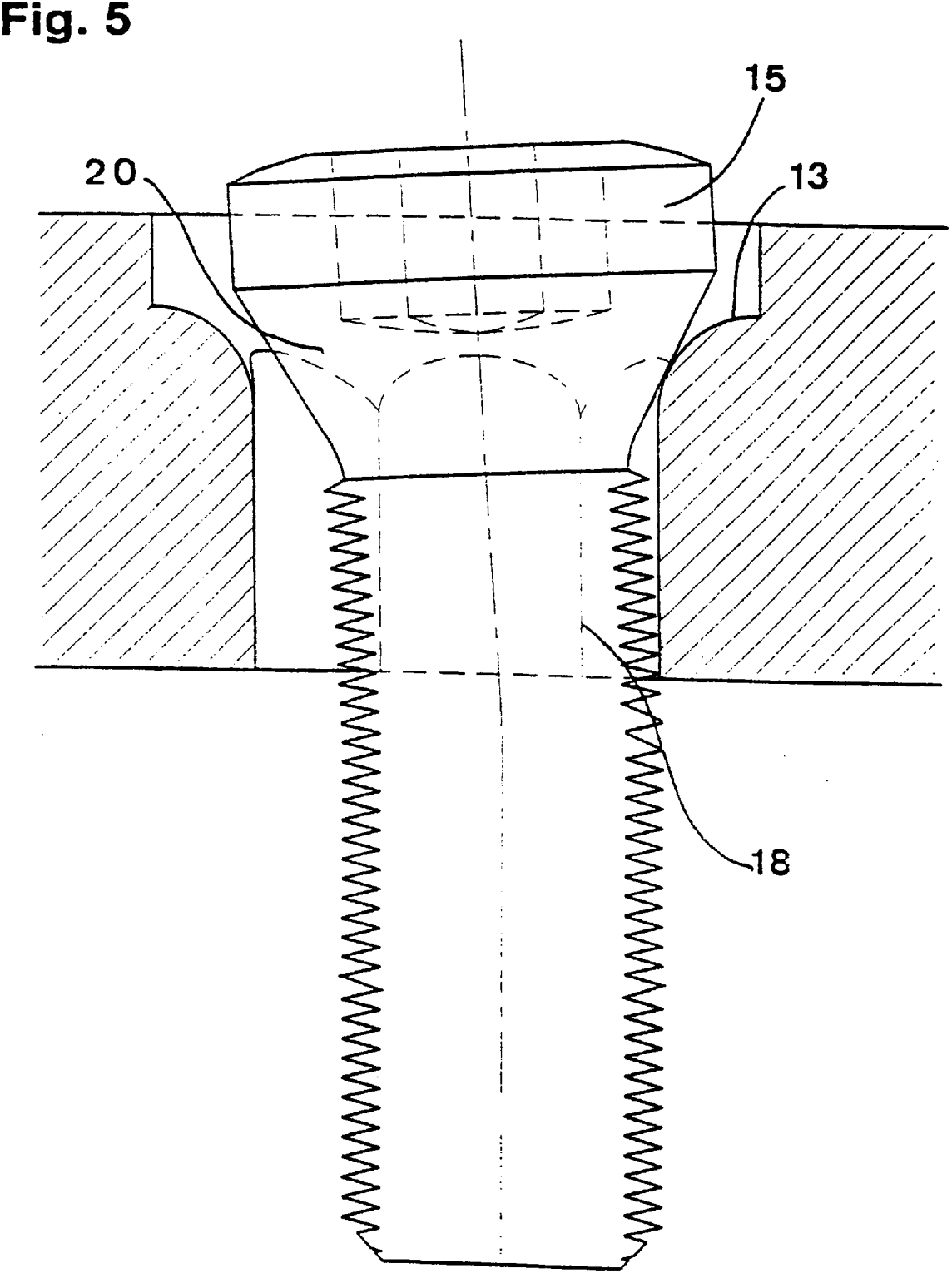
FIG. 5 illustrates the hole configuration in the insert according to the invention, straight from the side, the screw being fully tightened.

When the insert has been rotated to the right position, then it is clamped in this position by tightening the locking screw in accordance with FIG. 5. In a conventional manner, the conical bottom side 20 of the screw head is brought to bear against the radius surface 13, a one-point abutment, alternatively a one-line abutment in a vertical direction being attained between screw and insert. This bearing provides on one hand a horizontal force component, which forces the insert into the insert seat, and on the other hand a vertical force component, which presses the insert downwards against the bottom support surface of the insert seat. By the reaction force against the underside of the screw head from radius surface 13, when the insert presses against the support surfaces of the insert seat, the screw is bent somewhat, whereby it is distanced from the rotation-asymmetrical hole portion, and the bearing against the break lines 18 ceases.

Figure 6:
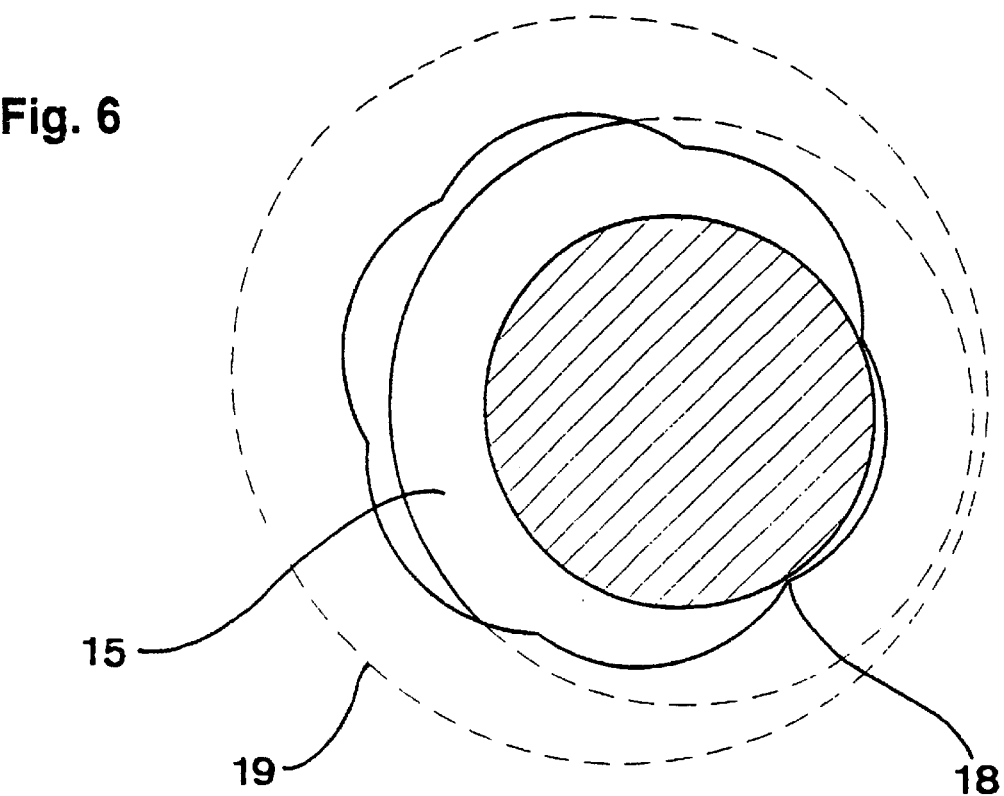
FIG. 6 illustrates the hole configuration in an insert according to the invention, straight from underneath, with a hexagonal basic geometry.

FIG. 6 shows the hole configuration from the bottom side of a cutting insert; in principle this is a partial amplification of FIG. 3. It illustrates how a cutting insert is directed towards the correct position by means of the guiding bearing against the break lines 18, either with a cutting insert with a hexagonal basic shape, or a round insert, which is intended to be indexed into six determined positions being equally distributed around the periphery of the insert.

Figure 7:
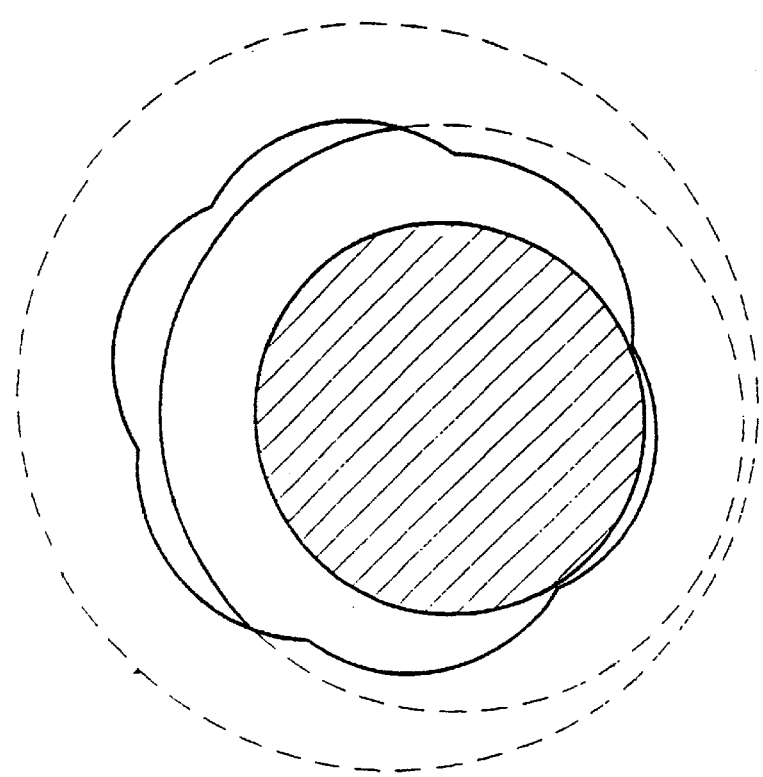
FIG. 7 illustrates the hole configuration in an insert according to the invention straight from underneath, with an octagonal basic geometry.

Analogously with FIG. 6, FIG. 7 shows how the hole configuration is shaped for either an insert with an octagonal basic shape, or for a round insert with eight predetermined indexation positions.

Figure 8:
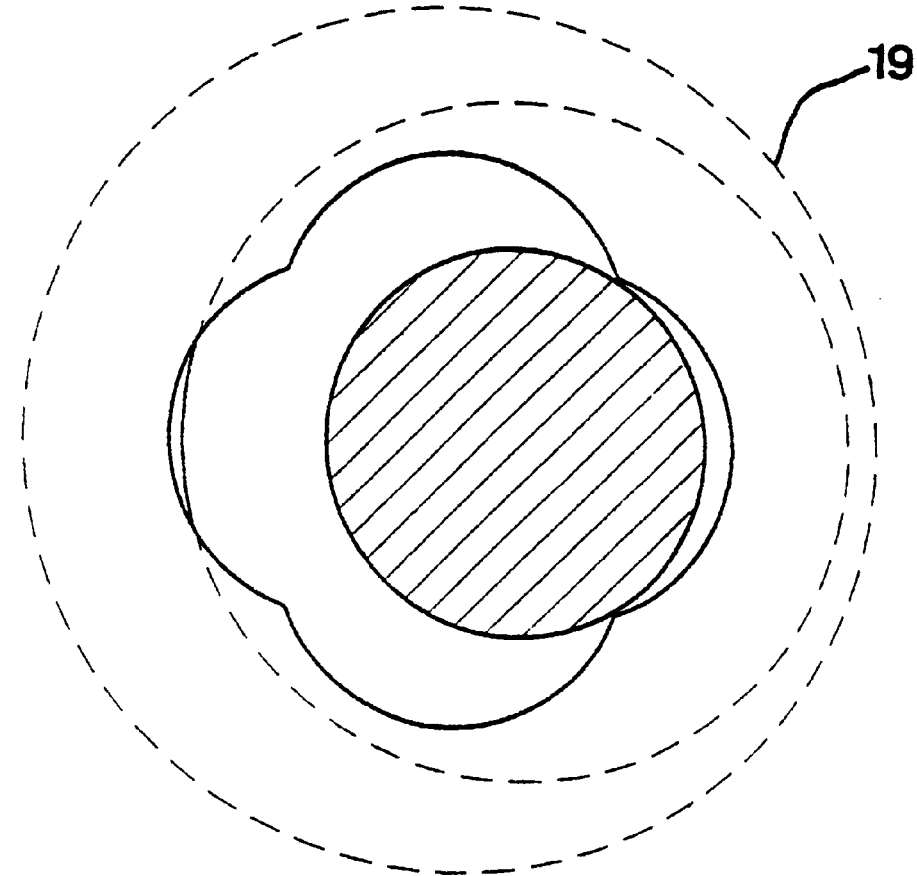
FIG. 8 illustrates the hole configuration in an insert according to the invention, straight from underneath, with a square basic geometry.

Analogously with FIGS. 6 and 7, FIG. 8 shows the shape of the hole configuration for either an insert with a square basic shape, or for a round cutting insert with four predetermined indexation positions.

The advantages of the present invention are evident. The operator attains a determined pre-positioning into the correct insert position in the insert seat already before the insert is clamped. This is of great help, specially when there are many cutting edges, such as for hexagonal and octagonal indexable cutting inserts, where a cutting insert by mistake may be forced into an erroneous position. Furthermore, the present invention makes possible a positioning of round cutting inserts into determined positions.

What is claimed is:

1. A tool for chip-breaking metal machining comprising a tool holder with an insert seat, a cutting insert with a through hole for the accommodation of a clamping screw which is arranged to clamp the cutting insert against a base surface and at least two abutment surfaces, said clamping screw having a head and a shank, said through hole having a rotation asymmetrical portion and means for contacting said screw shank along two vertical contact lines when the clamping screw is partially inserted in the through hole and means for contacting the screw head along a one point or one-line contact when the clamping screw is completely and tightly inserted into the through hole.

2. The tool according to claim 1, wherein said vertical line contact is established by having a cylindrical threaded part of the locking screw shank in contact with an inner surface of said through hole wherein a plurality of concave segments form transition ridges at their lines of interconnection, said ridges forming the vertical contact lines and being provided to guide the insert into the correct rotational position.

3. The tool according to claim 1, wherein, in connection with an upper or chip surface of the cutting insert, above the rotation-asymmetrical hole portion, there is located a rotation-symmetrical hole portion, which is intended to abut against the clamping screw by means of a point or line contact.

4. The tool according to claim 1, wherein the cutting insert has a hexagonal, octagonal or round basic shape.

5. The tool according to claim 2, wherein the insert includes a like number of concave segments and indexable positions.

6. The tool according to claim 1, wherein the means for contacting the screw head deflects the screw shank away from the two vertical contact lines when the clamping screw is completely inserted into the hole.

7. A cutting insert for chip-breaking metal machining comprising an upper chip surface, a lower bottom surface, which is subs antially plane parallel with the chip surface, one or several side surfaces extending between said chip and bottom surfaces, and a through hole for the accommodation of a clamping screw, said hole having a rotation asymmetrical portion, the rotation-asymmetrical portion comprises a plurality of vertical concave segments for positioning the cutting insert, and between the vertical concave segments are vertical, transition ridges extending along a major part of the inner surface of the hole, the rotation-asymmetrical portion is spaced from the chip surface, the cutting insert further comprising a rotation symmetrical portion arranged between the chip surface and the rotation-asymmetrical portion.

8. The cutting insert according to claim 7, wherein the cross-section of the rotation-asymmetrical portion has the shape of a number of interconnected concave segments extending radially outwards, and that the transition ridges between said segments function pair-wise as abutment and guiding lines for the insert.

9. The cutting insert according to claim 7, wherein, in connection with the upper chip surface of the cutting insert, above the rotation-asymmetrical hole portion, the rotation-symmetrical portion is intended to abut against the clamping screw by means of a point or line contact.

10. The cutting according to claim 7, wherein the cutting insert has a hexagonal, octagonal or round basic shape.

11. The cutting insert according to claim 7, wherein the rotation-asymmetrical portion is located adjacent the lower bottom surface.

* * * * *